United States Patent [19]
Haylock et al.

[11] Patent Number: 4,551,507
[45] Date of Patent: Nov. 5, 1985

[54] POLYESTER COMPOSITION CONTAINING TERTIARY AND QUATERNARY AMINE CARBOXYLATE SALTS

[75] Inventors: John C. Haylock, Dennysville, Me.; Nicholas Vanderkooi, Jr., Pompton Plains, N.J.

[73] Assignee: Allied Corporation, Morris Township, N.J.

[21] Appl. No.: 682,714

[22] Filed: Dec. 17, 1984

[51] Int. Cl.$^4$ .............................................. C08G 63/76
[52] U.S. Cl. .................................... 525/437; 524/602; 525/380; 528/288; 528/291
[58] Field of Search ................ 524/602; 528/288, 291; 525/437, 380

[56] References Cited

U.S. PATENT DOCUMENTS

| | | | |
|---|---|---|---|
| 3,761,450 | 9/1973 | Herwig et al. | 525/437 |
| 4,008,199 | 2/1977 | Gall | 524/131 |
| 4,022,748 | 5/1977 | Schlichting et al. | 523/219 |
| 4,035,341 | 7/1977 | Vaginay | 528/288 |
| 4,349,503 | 9/1982 | Aharoni | 528/288 X |

Primary Examiner—Lucille M. Phynes
Attorney, Agent, or Firm—Richard A. Negin; Richard A. Anderson; Patrick L. Henry

[57] ABSTRACT

A linear saturated polyester, such as polyethylene terephthalate containing from 0.1 percent to 20 percent of an amine carboxylate salt. The salt can be tertiary or a quaternary carboxylate salt.

30 Claims, No Drawings

POLYESTER COMPOSITION CONTAINING TERTIARY AND QUATERNARY AMINE CARBOXYLATE SALTS

DESCRIPTION

BACKGROUND OF THE INVENTION

This invention relates to a linear, saturated polyester composition; more particularly, the invention containing a tertiary and/or quaternary amine carboxylate salt.

DESCRIPTION OF THE PRIOR ART

It is known to use nucleating agents in crystallinizable polymers, such as linear saturated polyesters of aromatic dicarboxylic acids. U.S. Pat. Nos. 3,435,093; 3,516,957; 3,639,527; 4,349,503; 4,366,273; 4,327,007; 4,357,268; 4,352,904; and 4,351,757 disclose various approaches to molding thermoplastic compositions of linear saturated polyesters of aromatic dicarboxylic acids, and are particularly applicable to polyethylene terephthalate. These patents generally disclose the use of salts of hydrocarbon and polymeric carboxylic acids as nucleating agents for linear saturated polyesters. Great Britain Pat. No. 1,315,699 discloses the use of low molecular weight sodium, lithium or barium salts of mono- or poly-carboxylic acids used with solid, inert inorganic substances. Many of these patents disclose the importance of having a material which reduces the temperature at which crystallization will continue to occur upon cooling from the melt. This material can be considered to be a plasticizer.

A molding formulation based on a linear saturated polyester, such as polyethylene terephthalate, should result in molded product having good physical properties including flexural strength, modulus, tensile strength and impact properties. Further, the molding compound should also have good molding properties, including a melt flow index for sufficient flow into the mold, good mold release properties and good finished appearance.

From a practical point of view, it is desirable that satisfactory properties, as outlined above, be attained using water heated molds. That is, molds heated to temperatures between 76.7° C. (170° F.) to about 113° C. (235° F.). In order to accomplish this, it is desirable for crystallization to begin at as high a temperature as possible upon the cooling of the polyester which was fed into the mold, and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals appear upon heating an amorphous piece of polyester. $T_{cc}$ and $T_{ch}$ can be measured using a Differential Scanning Calorimeter.

SUMMARY OF THE INVENTION

This invention relates to a composition comprising a linear, saturated polyester, such as polyethylene terephthalate, containing from about 0.1 percent to 20 percent by weight based on the weight of the polyester of an amine carboxylate salt. The amine carboxylate salts which can be used in the composition of the present invention can include tertiary amine carboxylate salts and quaternary amine carboxylate salts. A tertiary amine carboxylate salt useful in the composition of the present invention has the formula:

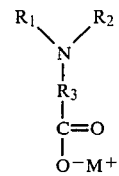

wherein $R_1$ and $R_2$ are aryl, alkyl or alkoxy groups having 1–36 carbon atoms, or H, $R_3$ is an alkyl group having 1–10 carbon atoms, and M is a metal selected from Group I or Group II of the Periodic Table of Elements.

Quaternary amine carboxylate salts useful in the composition of the present invention have the formula:

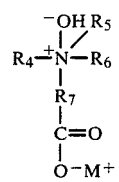

wherein $R_4$, $R_5$, and $R_6$ are aryl, alkyl or alkoxy groups having 1–36 carbon atoms or H, $R_7$ is an alkyl group having 1–10 carbon atoms, and M is a metal selected from Group I or Group II of the Periodic Table of Elements.

A preferred amine carboxylate salt has the formula:

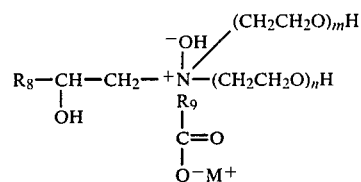

wherein $R_8$, is a hydrocarbon having from 1 to 36 carbon atoms and most preferably 24 carbon atoms and, m and n are equal to 30. $R_9$ has from 1 to 10 carbons and is most preferably $-CH_2$. M is a metal selected from Group I or Group II of the Periodic Table of Elements and is preferably sodium, potassium, or calcium and most preferably sodium or calcium.

The composition of the present invention can contain up to 10% by weight based on the weight of the polyester of an impact modifier. The composition can be filled with up to 150%, preferably 30 to 90% based on the weight of the polyester of a filler. Optionally, the composition can contain up to about 20% based on the weight of the polyester of a plasticizer. Optionally, the composition may contain up to about 1 percent based on the weight of the polyester of an inert nucleator such as talc.

The present invention includes a polyethylene terephthalate composition which can be molded in water heated molds. It contains the described amine carboxylate salts which widen the spread between $T_{cc}$ and $T_{ch}$. That is, the $T_{cc}$ is increased and the $T_{ch}$ is decreased, allowing crystallization to occur over as wide a range as possible.

Objects, features and advantages of the present invention will become apparent by reference to the following specification:

DESCRIPTION OF THE PREFERRED EMBODIMENTS

This invention relates to a composition comprising a linear, saturated polyester, preferably polyethylene terephthalate and from about 0.1 percent to about 20 percent by weight based on the weight of the polyester of an amine carboxylate salt.

The composition of the present invention includes linear, saturated polyesters of aromatic dicarboxylic acids. The preferred linear saturated polyesters include polyethylene terephthalate, polybutylene terephthalate, and poly(1,4-cyclohexane dimethylene terephthalate), with polyethylene terephthalate being most preferred due to low molding temperatures possible. The polyethylene terephthalate for use with the present invention has an intrinsic viscosity range between about 0.3 and about 1.20, with a preferred intrinsic viscosity range between about 0.4 and 0.7. Intrinsic viscosity is obtained by extrapolation of viscosity values to zero concentration of solutions of poly(ethylene terephthalate) in a 60 to 40 weight/volume ratio of phenol and tetrachloroethane. The measurements are normalized to 25° C. The polyethylene terephthalate melts between about 250° C. and 275° C. The polyethylene terephthalate can contain minor amounts, up to 5%, of other comonomers such as 1,4cyclohexyldimethyldiol, butyldiol, neopentyldiol, diethylene glycol, or glutaric acid.

The amine carboxylate salt of the present invention is selected from the group consisting of tertiary amine carboxylate salts and quaternary amine carboxylate salts. The tertiary amine carboxylate salts have the formula:

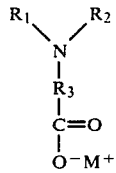

wherein $R_1$ and $R_2$ are aryl, alkyl or alkoxy groups having 1–36 carbon atoms, $R_3$ is an alkyl group having 1–10 carbon atoms, and M is a metal selected from Group I or Group II of the Periodic Table of Elements. Preferably, $R_1$ and $R_2$ are alkyl groups having from 1 to 36 carbon atoms and $R_3$ is an alkyl group having from 1 to 10 carbon atoms. The preferred metal M is selected from sodium, potassium, and calcium. In the most preferred embodiment $R_1$ and $R_2$ are alkyl groups having about 18 carbon atoms, $R_3$ is $-CH_2$ and M is sodium.

The quaternary amine carboxylate salt useful in the composition of the present invention has the formula:

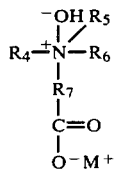

wherein $R_4$, $R_5$ and $R_6$ are aryl, alkyl or alkoxy groups having 1–36 atoms, $R_7$ is an alkyl group having 1–10 carbon atoms, and M is selected from Group I and Group II of the Period Table of Elements.

A preferred quaternary amine carboxylate salt has the formula:

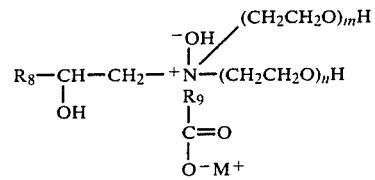

wherein $R_8$ is a hydrocarbon having from 1 to 36 carbon atoms, $R_9$ is a hydrocarbon having from 1 to 10 carbon atoms, m and n are integers from 1 to 36, and M is a metal selected from Group I or Group II of the Periodic Table of Elements. Preferably, $R_8$ is $C_{24}H_{49}-$, m and n are 30, and M is selected from sodium, potassium, and calcium with sodium and calcium being most preferred.

U.S. Pat. No. 3,813,422 discloses a quaternary amine sodium carboxylate salt, at column 4, and its method of preparation.

The amine carboxylate salts of the present invention have been found to not only nucleate the linear saturated polyester such as polyethylene terephthalate but surprisingly they have been found to plasticize the composition as well. By plasticizing the composition it is meant that the $T_{ch}$ is decreased. A problem with plasticizers in the past has been that they volatilized from the composition. The amine carboxylate salts of the present invention incorporate the nucleation and plasticizing properties into a single component. This component does not volatilize. Additionally, the amine carboxylate salts have been found to improve molding property such as mold release and surface appearance of molded articles.

There can be up to 20% based on the weight of the polyethylene terephthalate of an amine carboxylate salt. Preferably, there is from 0.1 to 20%, more preferably 0.5 to 10% and most preferably from 0.5 to 5%, of the amine carboxylate salt based on the weight of the polyester.

The amine carboxylate salt of the composition of the present invention behaves as a nucleating agent. The extent to which the amine carboxylate salt nucleates can be indicated by measuring $T_{cc}$.

The temperature at which crystal formation occurs is indicated by $T_{cc}$. The $T_{cc}$ is measured using a Differential Scanning Calorimeter which measures the heat evolved versus temperature. Between 5 and 10 milligrams of sample is prepared. The sample can be made in the form of a compression molded film which is vacuum dried or as a pellet which is hammered flat. The sample is placed in the Differential Scanning Calorimeter and heated to 280° C. where it is held for two minutes. The sample is cooled at 10° C. per minute. The $T_{cc}$ is the temperature of maximum heat evolution and appears as a peak in the cooling branch of the curve indicating the temperature at which the crystallization takes place. The $T_{cc}$ is approximately 195° C. to 200° C. for polyethylene terephthalate having an intrinsic viscosity normalized to about 0.50. It is desirable for crystallization from the melt to begin at as high a temperature as possible without adversely affecting other properties. This allows crystal nucleation to begin earlier and for crystallization to take place over a greater temperature range. The $T_{cc}$ is preferably at least 205° C., and more preferably at least 210° C. The $T_{cc}$ has been increased to as high as 219° C. using the reaction product of the present invention in a PET composition normalized to 0.5 intrinsic viscosity.

It has been found that the amine carboxylate salts of the present invention not only act as nucleators but they act as plasticizers in that they lower the $T_{ch}$ thereby allowing crystallization to take place as the polyester composition cools to lower temperatures. The plasticizing effect has been found to improve mold release properties and molded appearance of molded polyester, preferably polyethylene terephthalate articles. $T_{ch}$ is the temperature at which crystal formation occurs upon heating an amorphous piece of polyester. The use of a plasticizer reduces the $T_{ch}$. The $T_{ch}$ for pure polyethylene terephthalate (0.5 intrinsic viscosity) is approximately 125° C.-130° C. It is desirable to lower this value as much as possible for the best mold release and molded article release properties. The preferred polyethylene terephthalate composition should have as high a $T_{cc}$ as possible and as low a $T_{ch}$ as possible, allowing crystal formation and growth over the widest possible temperature range. The $T_{ch}$ is preferably not greater than about 110° C. It has been decreased to about 100° C. using 5 percent, based on the weight of the polyethylene terephthalate, of the quaternary salts of the present invention. Therefore, the temperature range over which crystallization can occur is from about 220° C. to about at least as low as 100° C. during cooling of the composition of the present invention. The range for pure polyethylene terephthalate is about 200° C. to 125° C.

The composition of the present invention can include additional additives such as fillers, impact modifiers, chain extenders, colorants, mold release agents, antioxidants, ultraviolet light stabilizers, and the like. Additionally, the composition of the present invention can optionally include other nucleating agents and plasticizers even with the use of the amine carboxylate salts of the present invention.

Any suitable filler can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, etc. The foregoing recited fillers are illustrative only and are not meant to limit the scope of the fillers that can be utilized in this invention. As noted above, the most preferred filler is glass fibers. There is up to 150 percent by weight of the polyethylene terephthalate of filler, and preferably 30 percent to 90 percent by weight of the polyethylene terephthalate of filler, preferably fiberglass.

As noted, the composition of the present invention can optionally contain additional plasticizers. A nonlimiting group of plasticizers is disclosed in the patents cited in the background of the present invention and hereby incorporated by reference. Of particular interest are the plasticizers disclosed in U.S. Pat. No. 4,352,904 and U.S. Pat. No. 4,327,007.

Plasticizers which can be used in the composition of the present invention include those types known in the art to be useful in linear saturated polyester molding compositions, preferably poly(ethylene terephthalate). A nonlimiting group of plasticizers which can be used is found in U.S. Pat. No. 4,352,904 which are organic esters. The organic esters can be the product of an aromatic carboxylic acid of 7-11 carbon atoms containing at least one carboxyl group per aromatic nucleus, and an alcohol selected from those of the formula $(HOCH_2)_xR^1$ wherein x is 1, 2 or 3 and $R^1$ is a hydrocarbon radical of 2-15 carbon atoms (preferably 2-10 carbon atoms) or those of the formula $HO-(R''O)_yR'''$ wherein y is a cardinal number between 1 and 15, and preferably between 1 and 8, $R''$ is a hydrocarbon radical of 2-15 carbon atoms, preferably 2-8 carbon atoms, and $R'''$ is —H or a hydrocarbon radical of 2-20 carbon atoms, preferably 2-12 carbon atoms. The plasticizer disclosed can also be the product of an aliphatic carboxylic acid or 1 to 20 carbon atoms containing 1-3 carboxyl groups, and an alcohol of the formula $HO(R''-O)_yR'''$, wherein $R''$, and $R'''$ and y are defined above. Further, the plasticizers disclosed include the following organic ketones of the formula

organic sulfones of the formula $RSOOR$; organic sulfoxides of the formula $R_2SO$; organic nitriles of the formula $RCN$; and organic amides of the formula

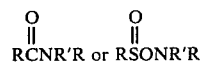

wherein R is a hydrocarbon radical having 1–25 carbons, and $R^1$ is a hydrogen or hydrocarbon radical having 1–25 carbon atoms. A preferred aliphatic plasticizer is dioctyl adipate, and a preferred aromatic plasticizer is neopentyl glycol dibenzoate. Other aromatic plasticizers which can be used include triethylene glycol dibenzoate, glyceryl tribenzoate, trimethylolethane tribenzoate, and pentaerythritol tetrabenzoate. In the present invention, up to about 15 percent by weight of the polyester of plasticizer can be used. Preferably, there is used between about 2 percent and 10 percent, and most preferably, between about 2 percent and about 6 percent of plasticizer, based on the weight of the poly(ethylene terephthalate). Particularly preferred plasticizers include toluenesulfonamide based plasticizers including N-stearyl o-toluenesulfonamide, N-stearyl p-toluenesulfonamide, N-ethyl p-toluenesulfonamide, N-ethyl p-toluenesulfonamide, o-toluenesulfonamide, p-toluene sulfonamide, and mixtures thereof. Polyethylene oxide based plasticizers can be also used.

The composition preferably includes impact modifiers known for use in polyester compositions. Preferred input modifiers are ethylene copolymers and terpolymers having carboxylic acids or derivatives. Preferably copolymers of ethylene and carboxylic acids, their esters or salts can be used as impact modifiers. Included among those impact modifiers are the following copolymers: ethylene-acrylic acid, methylene-acrylic acid, ethylene-ethyl acrylate, ethylene-vinyl acetate, and mixtures thereof. Useful impact modifiers include the metal salts of such carboxylic acids and particularly the sodium and potassium salts. There can be used up to about 30 percent, and preferably from about 2 percent and about 10 percent of the impact modifier, based on the weight of the poly(ethylene terephthalate).

The composition can contain up to about 5 percent, based on the weight of the polyethylene terephthalate, of a polyepoxide. The epoxy resin which can be used includes an epoxy formed from bisphenol-A and epichlorohydrin, polyepoxides obtained by reacting orthocresol novolac and epichlorohydrin, or the epoxy formed from bisphenol-A and glycidyl ether. Useful polyepoxides are epoxy cresol novolac resins of the type produced by Ciba-Geigy Corporation, and include ECN TM 1234, 1273 and 1299. A preferred polyepoxide is an epoxy formed from bisphenol-A and glycidyl ether. Preferably, there is from 0.5 percent to 4.0 percent, based on the weight of the polyethylene terephthalate, of polyepoxide. The polyepoxides act as chain extenders and help compensate for polyethylene terephthalate chains broken by hydrolysis.

Optionally, other nucleating agents known in the art, such as inert nucleating agents, as well as the nucleating agents disclosed in the various patents cited in the background of the invention, can be used in addition to the amine carboxylate salt of the present invention. Talc is an example of the preferred inert nucleating agent. Organic nucleating agents such as sodium salts of organic and polymeric carboxylic acids can also be used.

A preferred filled composition comprises polyethylene terephthalate, from 60% to 120% glass fibers from, 1.0 to about 3 percent of a polyepoxide and from about 0.7 to about 7 percent of a sodium amine carboxylate salt as described above. The percents are based on the weight of the polyethylene terephthalate.

As indicated in the examples to follow, the use of an amine carboxylate salt results in the polylinear saturated polyester, polyethylene terephthalate, molding composition which can be injection molded into water heated molds as temperatures as low as 76.7° C. (170° F.). As the mold temperature increases, there is an improvement in molded article appearance. The amine carboxylate salt and polyethylene terephthalate are melt blended. In the most preferred embodiment they can be melt blended in an extruder at a temperature above the melt temperature of the polyester. In a preferred embodiment the two components are melt blended at a temperature between 480° F. (200° C.) and 600° F. (316° C.) in an extruder.

The polyethylene terephthalate composition of the present invention can be formed by blending the components together by any convenient means to obtain an intimate blend. Neither temperature nor pressure are critical. For example, the polyethylene terephthalate can be mixed dry in a suitable blender or tumbler with the other components and the mixture melt extruded. The exudate can be chopped. If desired, a reinforcing or filling agent can be omitted initially and added after the first melt, and the resulting mixture can be melt extruded.

The composition of the present invention is particularly useful to make injection molded articles.

The examples and compositions set forth below illustrate the nature of the invention and the manner of carrying it out. However, the invention should not be considered as being limited to the details thereof. All parts are percent by weight unless otherwise indicated.

EXAMPLES 1–3

Examples 1–3 illustrate the composition of the present invention. The compositions were blended with polyethylene terephthalate (PET) in a 1 inch extruder having a barrel temperature of 270° C. The extruder had an L/D ratio of 25/1. The PET had a starting intrinsic viscosity of about 0.7. The quaternary amine carboxylic salts were sodium and calcium salts having the following formula:

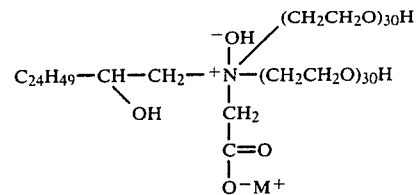

Where the metal cation ($M^+$) was sodium, the salt will be designated as sodium salt, and where M was calcium, the salt shall be designated as a calcium salt.

Differential Scanning Calorimeter (DSC) values were measured in accordance with the above-described procedure. Between 5 and 10 milligrams sample is prepared. The sample is made in the form a film which is vacuum dried. The sample is placed in the Differential Scanning Calorimeter and heated to 280° C. where it is held for 2 minutes. The sample is cooled at 10° C. per minute. The $T_{cc}$ appears as a sharp peak in the cooling branch of the curve.

$T_{ch}$ is measured using similar sample preparation. Except that the PET sample is melted and then quenched to assure that the sample is substantially amorphous. The sample is heated at 10° C. per minute and a crystallization curve forms when crystallization takes place. The $T_{ch}$ is the temperature at the peak of this curve.

Table I illustrates compositions of PET and the sodium or calcium salts. The PET had an intrinsic viscosity (IV) of 0.7. The $T_{ch}$ and $T_{cc}$ are listed as measured on pellets. $T_{ch}$ and $T_{cc}$ values are also listed for the composition normalized to a 0.5 IV.

TABLE 1

|  | Comp 1 | EX 1 | EX 2 | EX 3 |
|---|---|---|---|---|
| Ca salt | — | — | — | .5 |
| Na salt | — | .5 | 5 | — |
| IV | .49 | .59 | .52 | .67 |
| $T_{ch}$ °C. | 132 | 133 | 114 | — |
| $T_{cc}$ °C. | 198 | 198 | 216 | 203 |
| $T_{ch}$ °C. (0.5 IV) | 132 | 130 | 113 | 122 |
| $T_{cc}$ °C. (0.5 IV) | 198 | 203 | 217 | 213 |

The above results show that the salts of the present invention increase the $T_{cc}$ and decrease the $T_{ch}$. They act both as nucleators and plasticizers.

EXAMPLES 4–10

In Examples 4–10, polyethylene terephthalate compositions were prepared according to the procedure of Examples 1–3. The compositions contained PET having an IV of about 0.7, and the same sodium salt or calcium salt as used in Examples 2 and 3 respectively. All compositions contained 30 percent short glass fibers made PPG as PPG-3540 short glass fibers, 0.44% ECN 1299 polyepoxide made by Ciba-Geigy Corp., 0.12 percent Irganox 1010 hindered phenol stabilizer made by Ciba-Geigy, 2.8 percent ethylene acrylic acid copolymer made by Dow Chemical Corp. as Dow EAA-445, and 0.6% ethylene ethyl acrylate copolymer made by Union Carbide as Bakelite ® Felxible Ethylene Copolymer DPD-6169. The talc used in Example 10 is sold as nucleating talc by Whittaker and Clark Corp. as Talc 2610. In examples using plasticizers in addition to the salts of the present invention, the plasticizer was Monsanto 2097 which is a mixture of ortho and para N-stearyl toluene sulfonamide. Table 2 below summarizes the nucleators and plasticizers used in Examples 4–10.

The $T_{cc}$, $T_{ch}$ were measured for each composition as blended and normalized to 0.5 IV. The surface crystallinity is measured by the DSC or a sample from the surface of a molded bar. The area of the curve used to obtain $T_{ch}$ ($\Delta T_{ch}$) and the area of the melting peak curve used to obtain $T_m$ the melting point ($\Delta T_m$) are used in the expression $(1 - \Delta T_{ch}/\Delta T_m) \times 100$ to get the percentage crystallinity compared to the maximum crystallinity which occurs in the polyester.

The surface appearance (gloss) and the edge crystallinity are determined by visual observation of the molded bars to get relative ratings for the compositions. Edge crystallinity is indicated at G for good and F for fair. The edge crystallinity is a visual but sensitive measurement of the crystallization during injection molding. A translucent appearance indicates lower crystallinity.

Results are summarized in Table 2 below.

TABLE 2

|  | Ex 4 | Ex 5 | Ex 6 | Ex 7 | Ex 8 | Ex 9 | Ex 10 |
|---|---|---|---|---|---|---|---|
| Monsanto 2097 | 3.5 | 3.5 | — | 3.4 | — | — | 3.5 |
| Na salt | .5 | 5 | 5 | — | — | — | — |
| Ca salt | — | — | — | .6 | 3.4 | 3.4 | .5 |
| Talc | — | — | — | — | — | — | .5 |
| IV (Pellet) | .50 | .37 | .41 | .65 | .55 | .42 | .48 |
| $T_{ch}$ °C. (Pellet) | 116 | 100 | 98 | 121 | 123 | 118 | 118 |
| $T_{cc}$ °C. (Pellet) | 197 | 220 | 223 | 198 | 210 | 205 | 207 |
| $T_{ch}$ °C. | 116 | 103 | 100 | 116 | 121 | 120 | 118 |
| $T_{cc}$ °C. | 197 | 214 | 219 | 207 | 213 | 202 | 207 |
| Surface Appearance (Bar) | Good | E | E | E | E | — | G |
| Edge Crystallinity (Bar) | Fair | G | G | F | F | — | F |
| % Surface Crystallinity | 96.3 | 100 | 100 | 51.5 | 100 | — | 89.0 |

As can be seen from the above Tables, the composition of the present invention results in molded bars having excellent surface appearance and fair to good crystallinity with a surface crystallinity of 100 where 3.4 to 5 parts of salt were used. The quaternary salt whether it was sodium or calcium resulted in a reduction in the $T_{ch}$ and an increase in the $T_{cc}$.

While exemplemary embodiments of the invention have been described, the true scope of the invention is to be determined from the following claims.

What is claimed is:

1. A composition comprising:
   a linear saturated polyester; and from about 0.1 to 20 percent by weight of an amine carboxylate salt selected from the group consisting of a tertiary amine carboxylate salt and a quaternary amine carboxylate salt, the tertiary carboxylate salt having the formula:

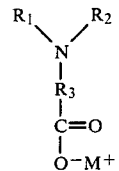

wherein $R_1$ and $R_2$ are selected from the group consisting of aryl, alkyl, or alkoxy groups having 1–36 carbon atoms, $R_3$ is an alkyl group having 1–10 carbon atoms, and M is selected from Group I or Group II of the Periodic Table; and
a quaternary amine carboxylate salt having the formula:

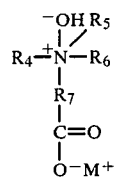

wherein $R_4$, $R_5$, and $R_6$ are selected from the group consisting of aryl, alkyl, and alkoxy groups having 1–36 carbon atoms and H, $R_7$ is an alkyl group having 1–10 carbon atoms and M is selected from Group I or Group II of the Periodic Table.

2. The composition as recited in claim 1 wherein the amine carboxylate salt is a quarternary amine carboxylate salt having the formula:

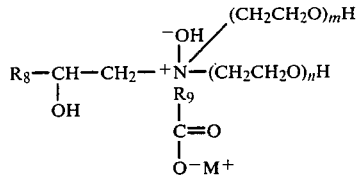

wherein $R_8$ is a hydrocarbon having from 1 to 36 carbon atoms, $R_9$ is a hydrocarbon having from 1 to 10 carbon atoms, m and n are integers from 1 to 36, and M is a metal selected from Group I or Group II of the Periodic Table.

3. The composition as recited in claim 2 wherein M is selected from sodium, potassium, and calcium, m and n are 30 and $R_8$ is $C_{24}H_{49}$ and $R_9$ is $CH_2$.

4. The composition as recited in claim 1 wherein the amine carboxylage salt is a tertiary amine carboxylate salt with $R_1$ and $R_2$ being alkyl groups having from 1 to 36 carbon atoms and $R_3$ is an alkyl group having from 1 to 10 carbon atoms.

5. The composition as recited in claim 1 further comprising up to 150 percent, based on the weight of the linear saturated polyester, of at least one filler.

6. The composition as recited in claim 5, wherein there is from about 30 percent to about 90 percent, based on the weight of the linear saturated polyester, of fiberglass filler.

7. The composition as recited in claim 1, further comprising up to 15 percent, based on the weight of the linear saturated polyester, of at least one plasticizer.

8. The composition as recited in claim 7, wherein there is between about 2 percent and about 10 percent, based on the weight of the linear saturated polyester, of the plasticizer.

9. The composition as recited in claim 8, wherein there is between about 2 percent and about 6 percent, based on the weight of the linear saturated polyester, of the plasticizer.

10. The composition as recited in claim 9 wherein the plasticizer is selected from the group consisting of: dioctyl adipate, neopentyl glycol dibenzoate, triethylene glycol dibenzoate, glyceryl tribenzoate, trimethylolethane, and pentaerythritol tetrabenzoate and neopentyl adipate benzoate, N-stearyl o,p-toluene sulfonamide, N-stearyl o-toluenesulfonamide, N-ethyl o-toluenesulfonamide, N-ethyl p-toluenesulfonamide, o-toluenesulfonamide, p-toluenesulfonamide, and mixtures thereof.

11. The composition as recited in claim 7, containing sufficient plasticizer for the composition to have a $T_{ch}$ of not greater than 110° C.

12. The composition as recited in claim 1 containing sufficient nucleating agent for the composition to have a $T_{cc}$ of at least about 200° C.

13. The composition as recited in claim 1 further comprising up to 30 percent, based on the weight of the linear saturated polyester, of an impact modifier.

14. The composition as recited in claim 13, wherein the impact modifier is selected from a group consisting of the following copolymers: ethylene acrylic acid, methylene acrylic acid, ethylene ethyl acrylate, ethylene vinyl acetate, and ethylene methyl acrylate.

15. The composition as recited in claim 14, containing between about 2 percent and about 10 percent based on the weight of the linear saturated polyester, of the impact modifier.

16. The composition as recited in claim 1 further comprising up to about 5 percent, based on the weight of the linear saturated polyester, of epoxy.

17. A process for preparing the composition of claim 1 which comprises mixing the components of the blend and then melt-extruding.

18. A process for preparing a molded article which comprises melting the composition of claim 1, placing the melted composition into a mold, and then allowing the composition to solidify.

19. The composition as recited in claim 1 wherein the linear saturated polyester is polyethylene terepthalate.

20. The composition as recited in claim 19 wherein there is from 0.5 to 10 percent by weight based on the polyethylene terephthalate of the amine carboxylate salt.

21. The composition as recited in claim 19 wherein there is from 0.5 to 5 percent by weight based on the polyethylene terephthalate of the amine carboxylate salt.

22. A composition comprising:
a linear saturated polyester; and from about 0.1 to 20 percent by weight of an amine carboxylate salt selected from the group consisting of a tertiary amine carboxylate salt and or quaternary amine carboxylate salt, the tertiary carboxylate salt having the formula:

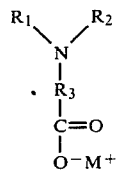

wherein $R_1$ and $R_2$ are selected from the group consisting of aryl, alkyl, or alkoxy groups having 1-36 carbon atoms, $R_3$ is an alkyl group having 1-10 carbon atoms, and M is selected from Group I of the Periodic Table; and the quaternary amine carboxylate salt having the formula:

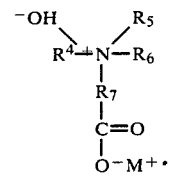

wherein $R_4$, $R_5$, and $R_6$ are selected from the group consisting of aryl, alkyl, and alkoxy groups having 1-36 carbon atoms and H, $R_7$ is an alkyl group having 1-10 carbon atoms and M is selected from Group I of the Periodic Table.

23. The composition as recited in claim 22 where M is sodium.

24. A composition comprising:
linear saturated polyester; and from about 0.1 to 20 percent by weight of an amine carboxylate salt selected from the group consisting of a tertiary amine carboxylate salt and or quaternary amine carboxylate salt, the tertiary carboxylate salt having the formula:

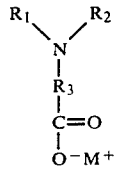

wherein $R_1$ and $R_2$ are selected from the group consisting of aryl, alkyl, or alkoxy groups having 1-36 carbon atoms, $R_3$ is an alkyl group having 1-10 carbon atoms, and M is selected from Group I of the Periodic Table; and the quaternary amine carboxylate salt having the formula:

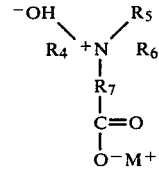

wherein $R_4$, $R_5$, and $R_6$ are selected from the group consisting of aryl, alkyl, and alkoxy groups having 1-36 carbon atoms and H, $R_7$ is an alkyl group having 1-10 carbon atoms and M is selected from Group I of the Periodic Table; and up to 150 percent, based on the weight of the polyethylene terephthalate of at least one filler.

25. The composition as recited in claim 24, wherein there is from about 30 percent to about 90 percent, based on the weight of the polyethylene terephthalate, of fiberglass filler.

26. The composition as recited in claim 24, further comprising up to 15 percent, based on the weight of the polyethylene terephthalate, of at least one plasticizer.

27. The composition as recited in claim 26, wherein there is between about 2 percent and about 10 percent, based on the weight of the polyethylene terephthalate, of the plasticizer.

28. The composition as recited in claim 24 further comprising up to 30 percent, based on the weight of the polyethylene terephthalate, of an impact modifier.

29. The composition as recited in claim 24 further comprising up to about 5 percent, based on the weight of the polyethylene terephthalate, of epoxy.

30. A composition comprising:
polyethylene terephthalate; and
from about 0.1 to 20 percent by weight of an amine carboxylate salt selected from the group consisting of a tertiary amine carboxylate salt and or quaternary amine carboxylate salt, the tertiary carboxylate salt having the formula:

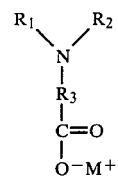

wherein $R_1$ and $R_2$ are selected from the group consisting of aryl, alkyl, or alkoxy groups having 1–36 carbon atoms, $R_3$ is an alkyl group having 1–10 carbon atoms, and M is selected from Group I of the Periodic Table; and quaternary amine carboxylate salt having the formula:

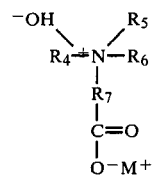

wherein $R_4$, $R_5$, and $R_6$ are selected from the group consisting of aryl, alkyl, and alkoxy groups having 1–36 carbon atoms and H, $R_7$ is an alkyl group having 1–10 carbon atoms and M is selected from Group I of the Periodic Table.

* * * * *